(12) United States Patent
Kitamura et al.

(10) Patent No.: US 10,773,593 B2
(45) Date of Patent: Sep. 15, 2020

(54) DISPLAY DEVICE

(71) Applicant: Mazda Motor Corporation, Aki-gun, Hiroshima (JP)

(72) Inventors: Yo Kitamura, Hiroshima (JP); Seiji Hisada, Higashihiroshima (JP); Hado Morokawa, Hiroshima (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 0 days.

(21) Appl. No.: 16/484,919

(22) PCT Filed: Feb. 15, 2018

(86) PCT No.: PCT/JP2018/005230
§ 371 (c)(1),
(2) Date: Aug. 9, 2019

(87) PCT Pub. No.: WO2018/151205
PCT Pub. Date: Aug. 23, 2018

(65) Prior Publication Data
US 2020/0055398 A1 Feb. 20, 2020

(30) Foreign Application Priority Data
Feb. 17, 2017 (JP) .................................. 2017-027679

(51) Int. Cl.
*B60K 35/00* (2006.01)
*B60K 37/02* (2006.01)
(Continued)

(52) U.S. Cl.
CPC .............. *B60K 35/00* (2013.01); *B60K 37/02* (2013.01); *B60Q 1/54* (2013.01); *B60R 1/00* (2013.01);
(Continued)

(58) Field of Classification Search
CPC .. B60K 35/00; B60K 37/02; B60K 2370/152; B60Q 1/54; B60R 2300/207;
(Continued)

(56) References Cited

U.S. PATENT DOCUMENTS 4,862,395 A * 8/1989 Fey ............................ B62J 6/01
702/146
6,226,588 B1 * 5/2001 Teramura ........... B60K 31/0008
123/319
(Continued)

FOREIGN PATENT DOCUMENTS

DE 4325721 A1 2/1995
GB 2479650 A 10/2011
(Continued)

OTHER PUBLICATIONS

European Patent Office, Extended European Search Report Issued in Application No. 18754599.1, dated Dec. 13, 2019, Germany, 7 pages.

*Primary Examiner* — Ojiako K Nwuogo
(74) *Attorney, Agent, or Firm* — Alleman Hall Creasman & Tuttle LLP

(57) ABSTRACT

A display device includes a display unit for displaying a moving body speed being a speed of a moving body, a first speed that is arbitrarily settable by a driver, and a second speed that is not arbitrarily settable by the driver. The display unit includes a display having a drawing function, and a frame member disposed to overlap the display. The display includes a display area spanning an inner side and an outer side of the frame member. The display displays the moving body speed and the first speed on the inner side of the frame member, and displays the second speed on the outer side of the frame member.

5 Claims, 8 Drawing Sheets

(51) Int. Cl.
*B60Q 1/54* (2006.01)
*B60R 1/00* (2006.01)
*G06K 9/00* (2006.01)
*G08G 1/0967* (2006.01)

(52) U.S. Cl.
CPC ... *G06K 9/00818* (2013.01); *G08G 1/096716* (2013.01); *G08G 1/096783* (2013.01); *B60K 2370/152* (2019.05); *B60R 2300/207* (2013.01); *B60R 2300/302* (2013.01)

(58) Field of Classification Search
CPC ............... B60R 2300/302; B60R 1/00; G06K 9/00818; G08G 1/096716; G08G 1/096783
USPC ......................................................... 340/936
See application file for complete search history.

(56) References Cited

U.S. PATENT DOCUMENTS

| | | | |
|---|---|---|---|
| 6,373,400 B1* | 4/2002 | Fujita | B60K 35/00 340/901 |
| 6,472,977 B1* | 10/2002 | Pochmuller | B60K 35/00 340/425.5 |
| 6,690,300 B1* | 2/2004 | Gaskins | B63H 21/213 340/815.4 |
| 7,589,643 B2* | 9/2009 | Dagci | B60K 31/185 340/905 |
| 2007/0262883 A1* | 11/2007 | Kumabe | G08G 1/096716 340/936 |
| 2009/0267753 A1* | 10/2009 | Kim | B60K 35/00 340/462 |
| 2012/0253628 A1* | 10/2012 | Maruyama | B60W 50/085 701/93 |
| 2017/0178507 A1* | 6/2017 | Yokochi | B60K 31/18 |
| 2019/0366918 A1* | 12/2019 | Zhou | B60Q 1/30 |

FOREIGN PATENT DOCUMENTS

| | | |
|---|---|---|
| JP | 2001514110 A | 9/2001 |
| JP | 2007304791 A | 11/2007 |
| JP | 2010143407 A | 7/2010 |
| JP | 2011218889 A | 11/2011 |
| JP | 2016133422 A | 7/2016 |
| WO | 9838059 A1 | 9/1998 |

* cited by examiner

DISPLAY DEVICE

TECHNICAL FIELD

The present invention relates to a display device for displaying information such as a speed to a driver of a moving body such as a vehicle.

BACKGROUND ART

A display device (meter device) for displaying information to a driver is provided on a front side of a driver's seat of a moving body such as a vehicle. In recent years, the display device may also display, in addition to a speed of a vehicle (own vehicle speed) at a point of time when the own vehicle speed is displayed, speed information on a speed other than the own vehicle speed. For example, Patent Literature 1 proposes a display device for displaying a predetermined recognition speed, in addition to an own vehicle speed.

When the number of types of speed information to be displayed on a display device increases, how to display each piece of the speed information, and how to let a driver recognize become issues. In this regard, the inventors of the present invention found that some pieces of speed information are relatively easily recognized, and some pieces of speed information are relatively less likely to be recognized by a driver depending on a type of speed information.

CITATION LIST

Patent Literature

Patent Literature 1: Japanese Unexamined Patent Application Publication No. 2010-143407

SUMMARY OF INVENTION

In view of the above, an object of the present invention is to provide a display device that enables to appropriately convey each piece of speed information to a driver, based on determination as to whether the speed information is speed information easily recognized by a driver of a moving body.

A display device according to the present invention is a display device for displaying information relating to at least a moving body to a driver of the moving body. The display device includes a display unit for displaying a moving body speed being a speed of the moving body, a first speed that is arbitrarily settable by the driver, and a second speed that is not arbitrarily settable by the driver. The display unit includes a display having a drawing function, and a frame member disposed to overlap the display. The display includes a display area spanning an inner side and an outer side of the frame member. The display displays the moving body speed and the first speed on the inner side of the frame member, and displays the second speed on the outer side of the frame member.

DESCRIPTION OF EMBODIMENTS

In the following, a display device according to an embodiment of the present invention is described.

<Entire Configuration>

Figure 1:
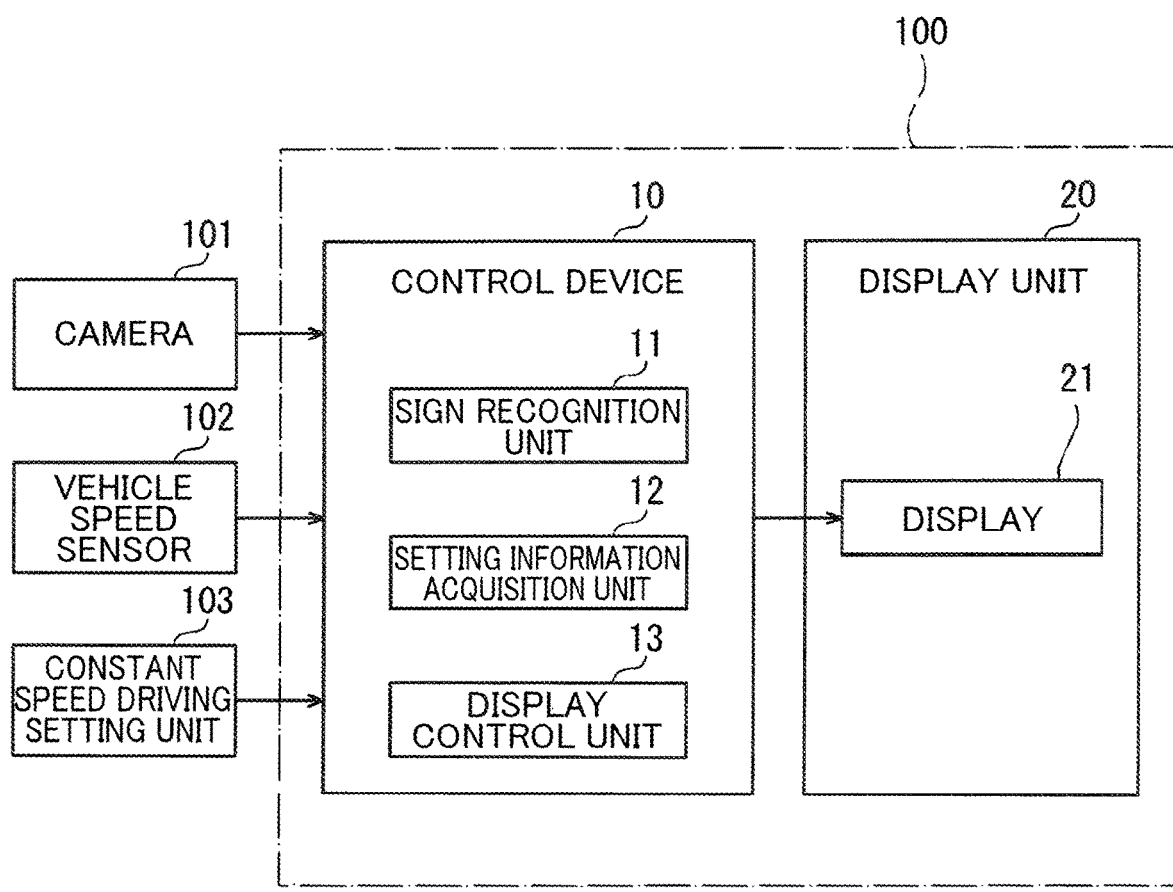
FIG. 1 is a block diagram of a display device.

First, an entire configuration of a display device is described. FIG. 1 is a block diagram of a control system of a display device 100. As illustrated in FIG. 1, the display device 100 includes a control device 10 and a display unit 20. The display device 100 is mounted on an instrument panel (not illustrated), which is disposed on a front side of a driver's seat of a vehicle as a moving body. The display device 100 displays various types of information to a driver seated on the driver's seat. The embodiment of the present invention describes a vehicle, more specifically, an automobile, as a moving body. The present invention, however, may be applied to a moving body other than a vehicle.

The control device 10 is constituted by a CPU, a ROM, a RAM, and the like. Further, the control device 10 is electrically connected to a camera 101 for photographing outside of a vehicle, a vehicle speed sensor 102 for measuring an own vehicle speed, and a constant speed driving setting unit 103 for performing setting on constant speed driving control. The control device 10 acquires vehicle-outside video information, own vehicle speed information, and constant speed driving setting information, respectively, based on a signal to be transmitted from the pieces of equipment (101 to 103). Further, the control device 10 performs various calculations, based on pieces of information acquired from the pieces of equipment, and transmits a control signal to the display unit 20.

In this section, constant speed driving control is described. Constant speed driving control includes control (cruise control) of simply driving a vehicle at a constant speed, and control (active cruise control) of driving a vehicle at a constant speed, when there is a distance equal to or larger than a fixed value with respect to a preceding vehicle. A driver can arbitrarily set whether constant speed driving control is performed, and a speed when constant speed driving is performed by using the constant speed driving setting unit 103. In the following, when a "setting speed" is simply mentioned, the "setting speed" means a speed of constant speed driving set by the constant speed driving setting unit 103.

Further, the control device 10 includes, as a functional configuration, a sign recognition unit 11, a setting information acquisition unit 12, and a display control unit 13. Among these elements, the sign recognition unit 11 recognizes a limiting speed written on a speed sign, which is installed on the outside of a vehicle, based on vehicle-outside video information acquired from the camera 101. Further, the setting information acquisition unit 12 acquires constant speed driving setting information set by the constant speed driving setting unit 103, namely, information indicating whether constant speed driving control is performed, and information on a set setting speed. Furthermore, the display control unit 13 controls a display 21 by transmitting a control signal to the display 21 of the display unit 20, which is described later.

The display unit 20 includes the display 21 having a drawing function. The display 21 displays a predetermined content including each piece of speed information, based on a control signal transmitted from the display control unit 13. In this example, the display 21 is, for example, a liquid crystal display, and the drawing function is a function of displaying an image such as a figure, a character, and a number, which is stored in advance (or given by communication). Details on the display unit 20 are described in the following.

<Configuration of Display Unit>

Figure 2:
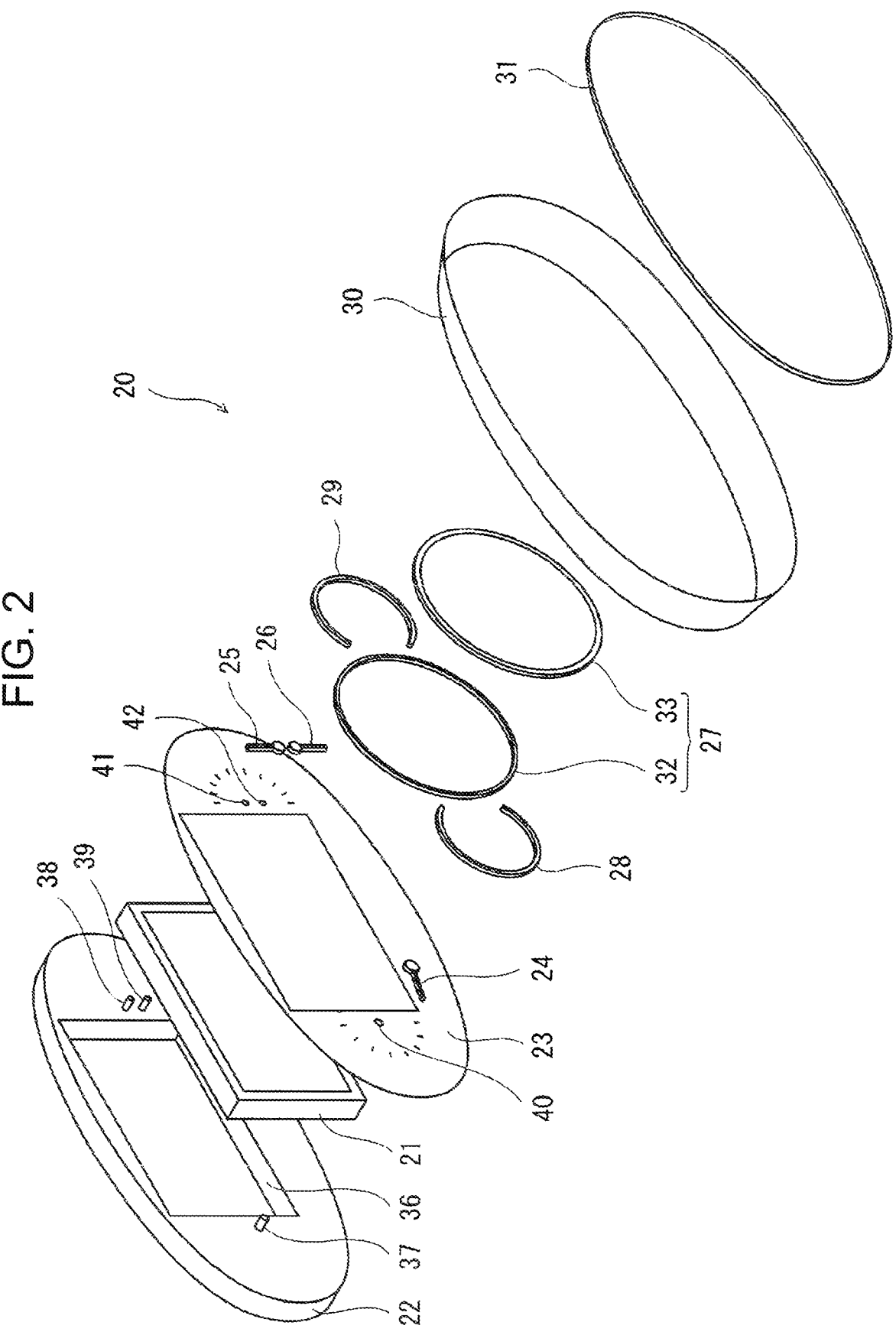
FIG. 2 is an exploded perspective view of a display unit.

Next, a configuration of the display unit 20 is described in detail. FIG. 2 is an exploded perspective view of the display unit 20. As illustrated in FIG. 2, the display unit 20 includes, in addition to the display 21, a base plate 22, a screen 23, a tachometer pointer 24, a water temperature meter pointer 25, a fuel meter pointer 26, a circular frame member 27, a frame member 28 for a tachometer, a frame member 29 for a water temperature meter and a fuel meter, an outer perimeter cover 30, and a surface cover 31.

The base plate 22 includes an insertion portion 36 for receiving the display 21. When the display 21 is received in the insertion portion 36, a surface of the display 21 and a surface of the base plate 22 are located on a same plane. Further, the base plate 22 includes a tachometer driving motor 37 for driving the tachometer pointer 24, a water temperature meter driving motor 38 for driving the water temperature meter pointer 25, and a fuel meter driving motor 39 for driving the fuel meter pointer 26. For convenience of explanation, in FIG. 2, only drive axes of the respective motors 37, 38, and 39 are illustrated, and reference numbers are appended to the respective drive axes.

The screen 23 is a member for covering a surface of the display 21 and a surface of the base plate 22. A portion of the screen 23 associated with the display 21 is transparent and has light transparency. On the other hand, a portion of the screen 23 other than the portion associated with the display 21 is coated black, for example, and does not have light transparency. Further, through-holes 40, 41, and 42 are formed in portions of the screen 23 respectively associated with the driving motors 37, 38, and 39. The drive axes of the driving motor 37, 38, and 39 respectively pass through the through-holes 40, 41, and 42. Furthermore, a tachometer scale is drawn on a portion of the screen 23 associated with the tachometer pointer 24, a scale for a water temperature meter is drawn on a portion of the screen 23 associated with the water temperature meter pointer 25, and a scale for a fuel meter is drawn on a portion of the screen 23 associated with the fuel meter pointer 26 (also see FIG. 3).

The tachometer pointer 24 is mounted on the drive axis of the tachometer driving motor 37, and designates an engine rotation number at a point of time when measurement is performed. Further, the water temperature meter pointer 25 is mounted on the drive axis of the water temperature meter driving motor 38, and designates a temperature of cooling water at a point of time when measurement is performed. The fuel meter pointer 26 is mounted on the drive axis of the fuel meter driving motor 39, and designates an amount of fuel inside a fuel tank at a point of time when measurement is performed.

Figure 3:
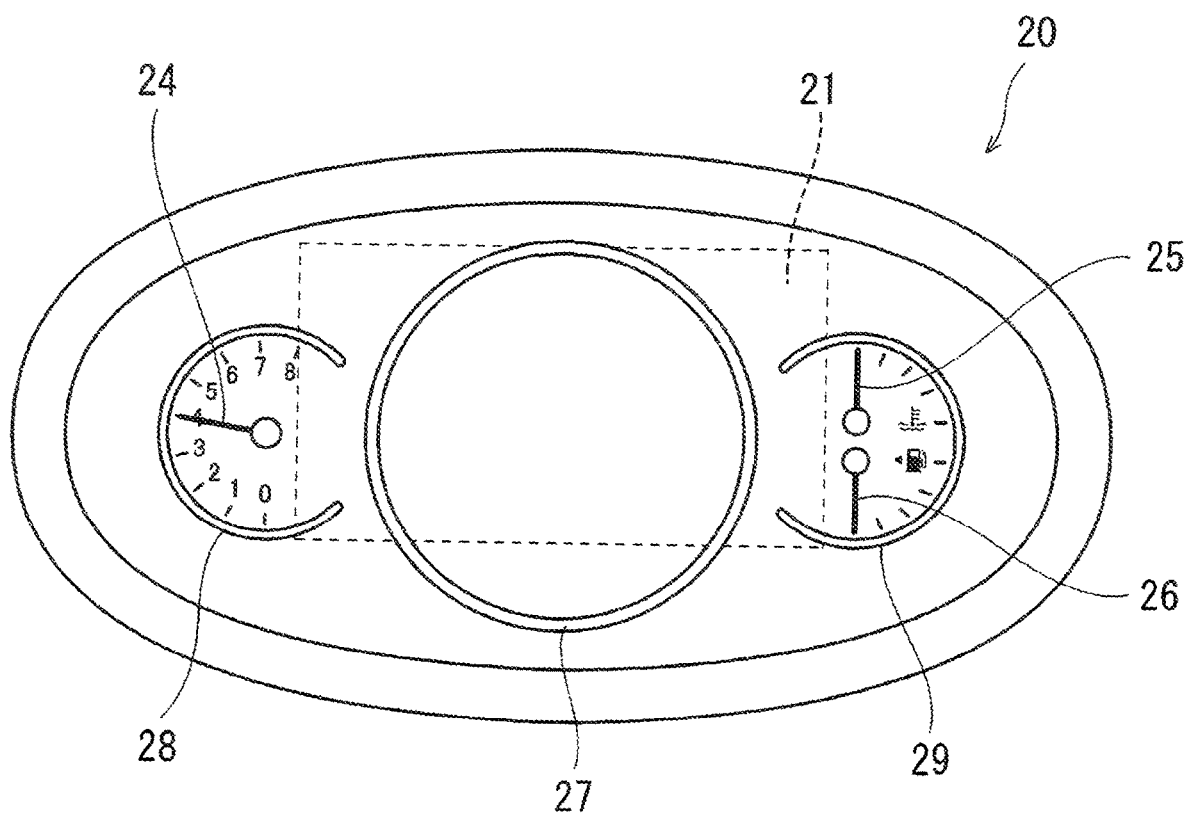
FIG. 3 is a diagram illustrating the display unit, when a display is in a non-display state.

The circular frame member 27 is a circular frame member located at a middle of the display unit 20. The circular frame member 27 in the present embodiment is constituted by an annular-shaped base ring 32, and an annular-shaped decorative ring 33 for covering the base ring 32 from above. FIG. 3 is a diagram of the display unit 20 viewed from a driver's seat when the display 21 is in a non-display state. An area surrounded by a broken line in FIG. 3 indicates a display area of the display 21. As illustrated in FIG. 3, the circular frame member 27 is disposed over the display 21. The display 21 has a display area spanning an inner side and an outer side of the circular frame member 27.

The tachometer frame member 28 is a frame member of an arc shape (circular shape in which a part is missing). The tachometer frame member 28 is disposed on a portion of the screen 23 where a tachometer scale is drawn. Further, the frame member 29 for a water temperature meter and a fuel meter is a frame member of an arc shape (circular shape in which a part is missing). The frame member 29 is disposed on a portion of the screen 23 where a scale of a water temperature meter and a scale of a fuel meter are drawn. Although a part of the tachometer frame member 28 and a part of the frame member 29 for a water temperature meter and a fuel meter overlap the display 21, the tachometer pointer 24, the water temperature meter pointer 25, and the fuel meter pointer 26 are located on the outer side of the display 21.

The outer perimeter cover 30 is a member for defining an outer perimeter of the display unit 20. The surface cover 31 is a member having light transparency, and configured to cover a surface of the screen 23 from outside of the frame members 27 to 29 and the pointers 24 to 26 (from the driver's seat side).

<Display Pattern>

Figure 4:
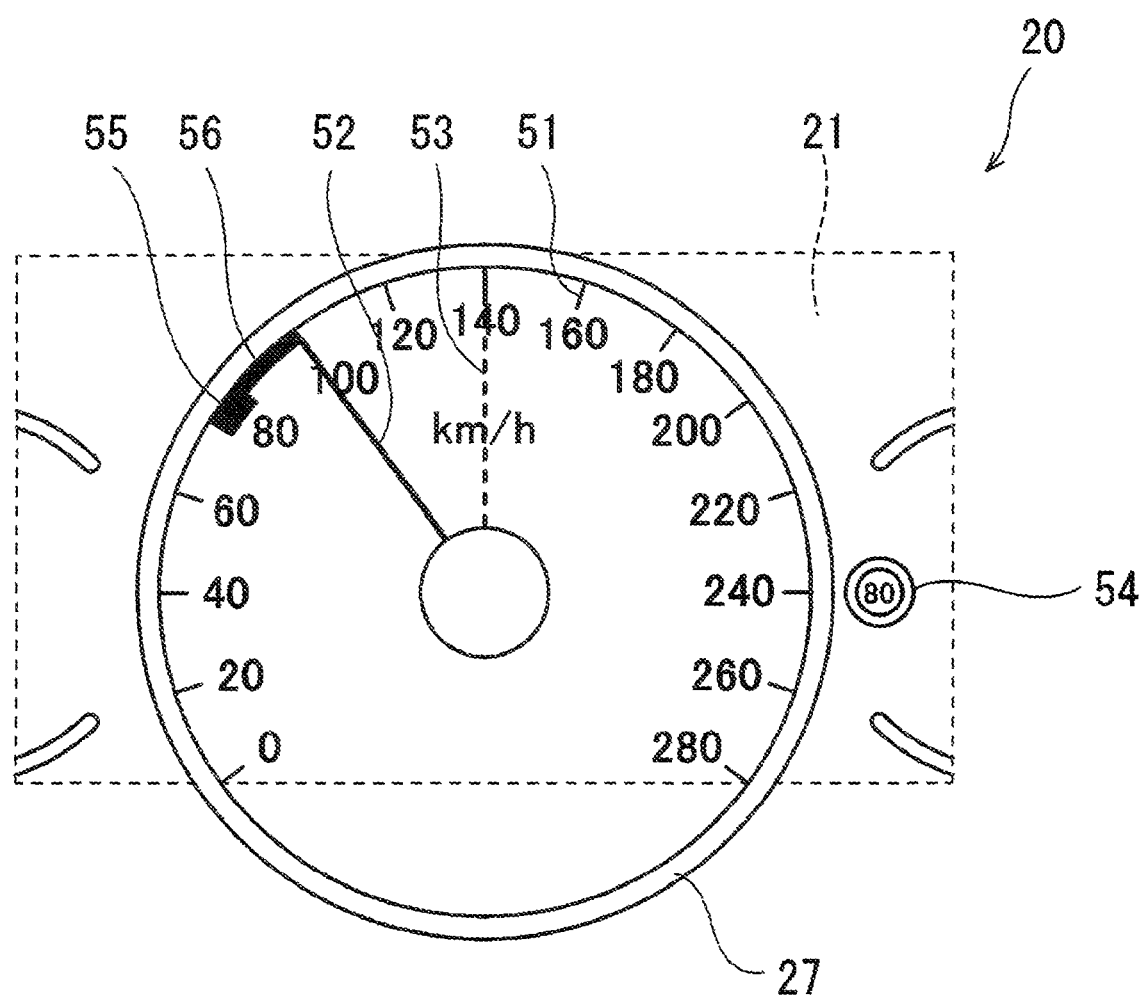
FIG. 4 is a diagram illustrating the display unit, when the display displays each piece of speed information, and illustrates a display content in a first mode.

Next, a display pattern of each piece of speed information by the display unit 20 is described. FIG. 4 is a diagram of the display unit 20, when viewed from a driver's seat side, and illustrates a state that the display 21 displays each piece of speed information. The display 21 displays, as speed information, an own vehicle speed being a speed of a vehicle at a point of time when measurement is performed, a setting speed for constant speed driving control, and a limiting speed recognized by the sign recognition unit 11. Specifically, the display 21 displays a speed scale 51, an own vehicle speed pointer 52, a setting speed pointer 53, and a simulated sign 54.

The speed scale 51 is a scale indicating a speed. The speed scale 51 is drawn on the inside of the circular frame member 27 along the circular frame member 27.

The own vehicle speed pointer 52 is a movable pointer indicating an own vehicle speed. The own vehicle speed pointer 52 is located on the inner side of the circular frame member 27, and designates a value of the speed scale 51 associated with the own vehicle speed. Note that the own vehicle speed pointer 52 is indicated as an image analogous to a real meter pointer. In this way, in the present embodiment, an own vehicle speed is displayed on the inner side of a circular area surrounded by the circular frame member 27 by the speed scale 51 and the own vehicle pointer 52. In other words, an own vehicle speed is displayed in a way similar to a conventional analog speed meter.

The setting speed pointer 53 is a fixed pointer indicating a setting speed for constant speed driving control. The setting speed pointer 53 is drawn, when a setting speed for constant speed driving control is set by the constant speed driving setting unit 103. Further, the setting speed pointer 53 is located on the inner side of the circular frame member 27, and fixedly designates a value of the speed scale 51 associated with a setting speed. The setting speed pointer 53 is indicated by a broken line. In this way, a setting speed for constant speed driving control is displayed on the inner side of a circular area surrounded by the circular frame member 27 by the speed scale 51 and the setting speed pointer 53.

The simulated sign 54 simulates a speed sign associated with a limiting speed recognized by the sign recognition unit 11. For example, when a speed sign defined by regulations is a sign such that a limiting speed is written within a red circle, the display unit 20 draws an image such that a limiting speed is written within a red circle, as the simulated sign 54. The simulated sign 54 is drawn, when the sign recognition unit 51 recognizes a limiting speed. Further, the simulated sign 54 is located on the outer side of the circular frame member 27, and near the frame member 29 for a water temperature meter and a fuel meter. In this way, a limiting speed recognized by the sign recognition unit 11 is displayed on the outer side of a circular area surrounded by the circular frame member 27 by the sign recognition unit 11.

In the present embodiment, when the sign recognition unit 11 recognizes a limiting speed, in addition to that the simulated sign 54 is drawn, a portion of the speed scale 51 associated with the limiting speed is emphasized, as compared with the other portion. Specifically, the display 21 draws a mark 55 at a portion of the speed scale 51 associated with a limiting speed. Further, when an own vehicle speed exceeds the limiting speed, an area of the speed scale 51 from a portion associated with the limiting speed to a portion associated with the own vehicle speed is emphasized, as compared with the other area. Specifically, the display 21 draws a band-shaped arch 56 in an area of the speed scale 51 from a portion associated with a limiting speed to a portion associated with an own vehicle speed.

<Display Mode>

Next, a display mode of each piece of speed information to be displayed by the display unit 20 is described. The display unit 20 illustrated in FIG. 4 displays all speeds, namely, an own vehicle speed, a setting speed, and a limiting speed. However, it is not always the case that the display unit 20 displays all the speeds constantly. A display mode associated with speed information to be displayed, namely, a display speed to be displayed is determined depending on a condition. Determination of a display mode is performed by the display control unit 13.

Figure 5:
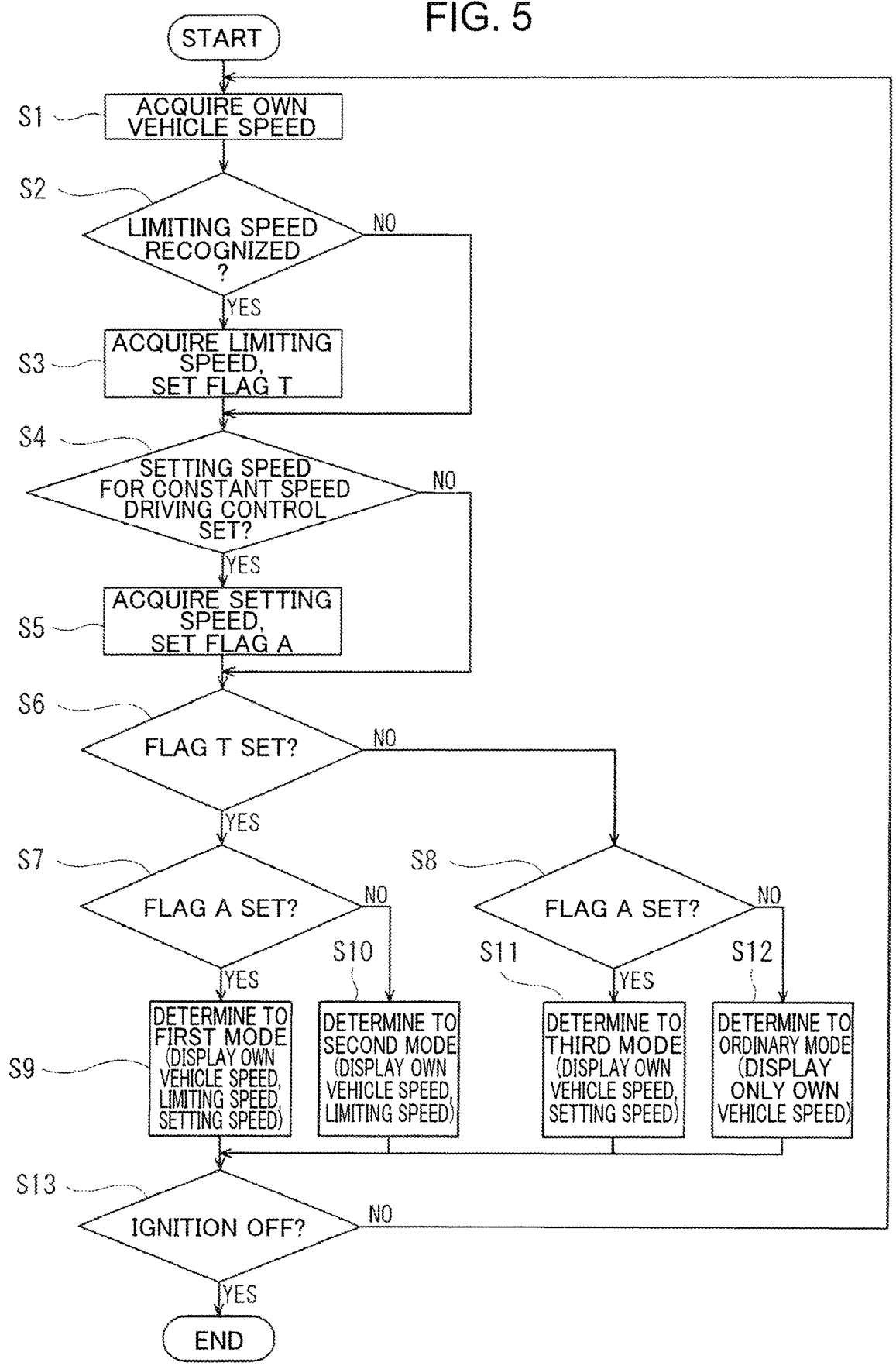
FIG. 5 is a flowchart illustrating a flow of control of determining a display mode.

FIG. 5 is a flowchart illustrating a flow of control of determining a display mode. The control is started in response to turning on of ignition. When the control is started, the display control unit 13 acquires an own vehicle speed (Step S1). Subsequently, determination is made as to whether a limiting speed is recognized by the sign recognition unit 11 (Step S2). When the limiting speed is recognized (YES in Step S2), the recognized limiting speed is acquired, and a flag T is set (Step S3). Thereafter, the control proceeds to Step S4. On the other hand, when the limiting speed is not recognized (NO in Step S2), the control proceeds to Step S4 without proceeding to Step S3.

Subsequently, in Step S4, determination is made as to whether a setting speed for constant speed driving control is set. When the setting speed is set (YES in Step S4), the set setting speed is acquired, and a flag A is set (Step S5). Thereafter, the control proceeds to Step S6. On the other hand, when the setting speed is not set (NO in Step S4), the control proceeds to Step S6 without proceeding to Step S5.

Subsequently, in Step S6, determination is made as to whether the flag T is set. When the flag T is set (YES in Step S6), the control proceeds to Step S7. On the other hand, when the flag T is not set (NO in Step S6), the control proceeds to Step S8.

Subsequently, in Step S7, determination is made as to whether the flag A is set. When the flag A is set (YES in Step S7), the control proceeds to Step S9. At a point of time when the control proceeds to Step S9, since all the speeds, namely, an own vehicle speed, a limiting speed, and a setting speed are acquired, the display control unit 13 determines, as a display mode, a first mode in which all the speeds, namely, an own vehicle speed, a limiting speed, and a setting speed as illustrated in FIG. 4 are displayed, and displays each piece of display information. Thereafter, the control proceeds to Step S13.

Figure 6:
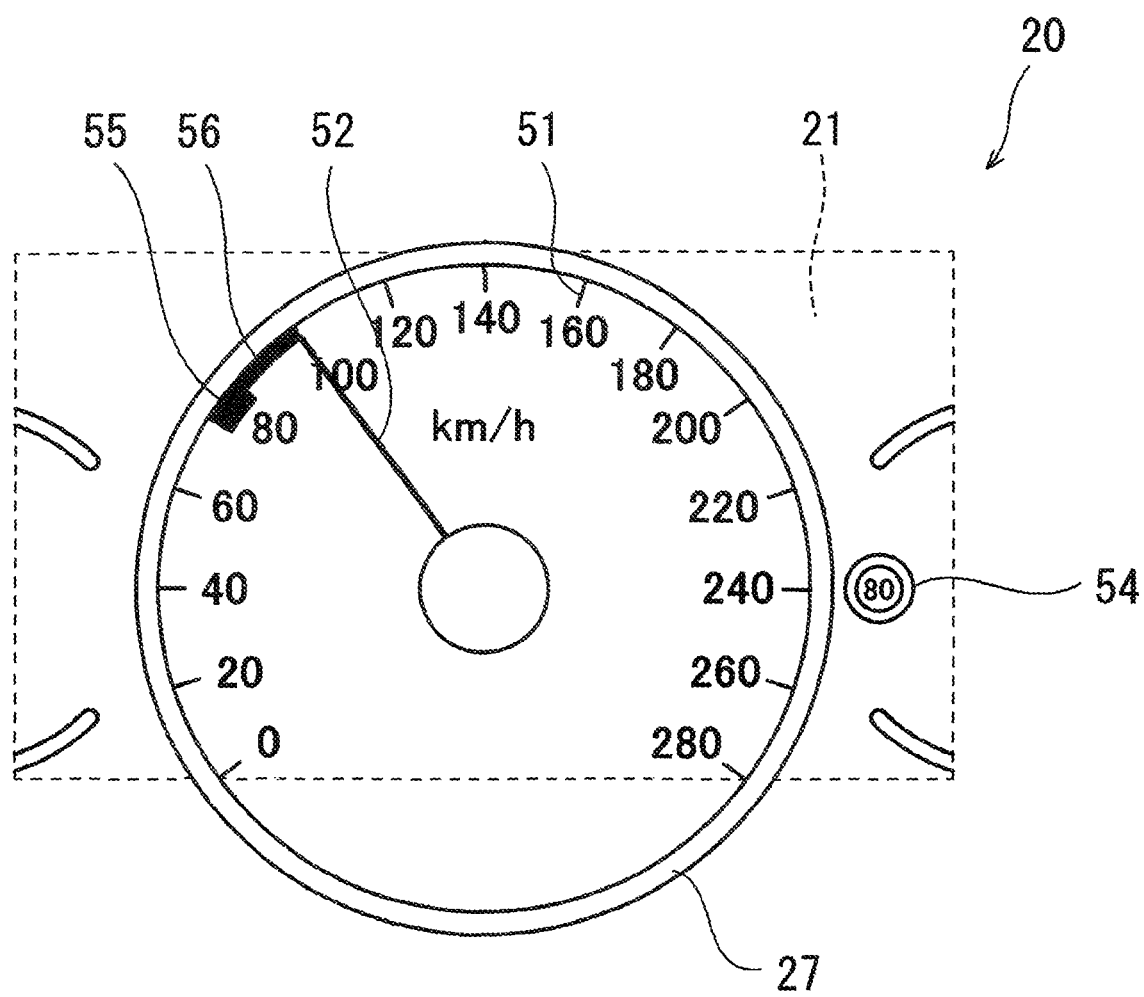
FIG. 6 is a diagram illustrating a display content in a second mode.

On the other hand, in Step S7, when the flag A is not set (NO in Step S7), the control proceeds to Step S10. At a point of time when the control proceeds to Step S10, since an own vehicle speed and a limiting speed are acquired, the display control unit 13 determines, as a display mode, a second mode in which an own vehicle speed and a limiting speed as illustrated in FIG. 6 are displayed, and displays each piece of display information. Thereafter, the control proceeds to Step S13.

Figure 7:
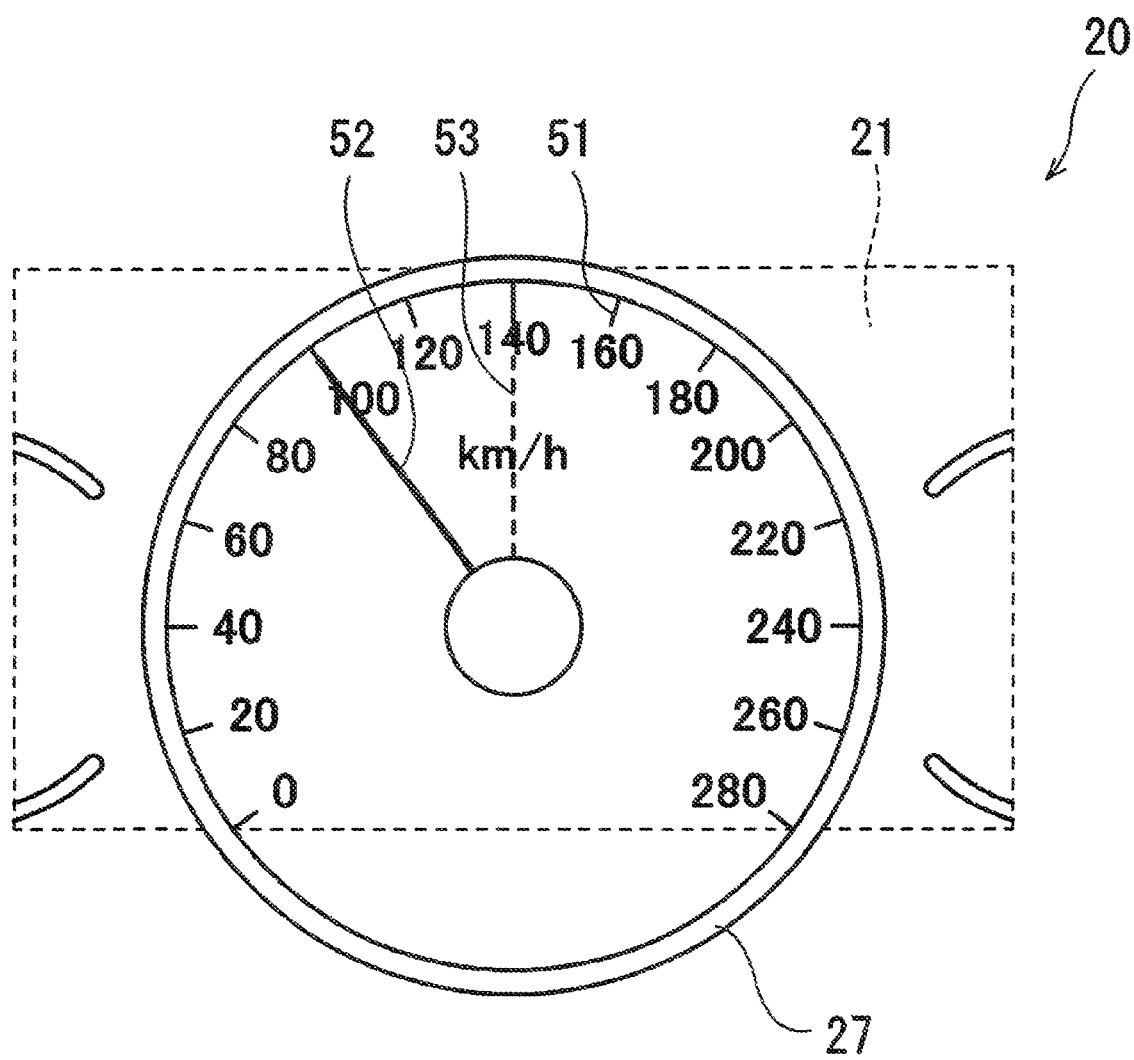
FIG. 7 is a diagram illustrating a display content in a third mode.

Subsequently, in Step S8, determination is made as to whether the flag A is set. When the flag A is set (YES in Step S8), the control proceeds to Step S11. At a point of time when the control proceeds to Step S11, since an own vehicle speed and a setting speed are acquired, the display control unit 13 determines, as a display mode, a third mode in which an own vehicle speed and a setting speed are displayed as illustrated in FIG. 7, and displays each piece of display information. Thereafter, the control proceeds to Step S13.

Figure 8:
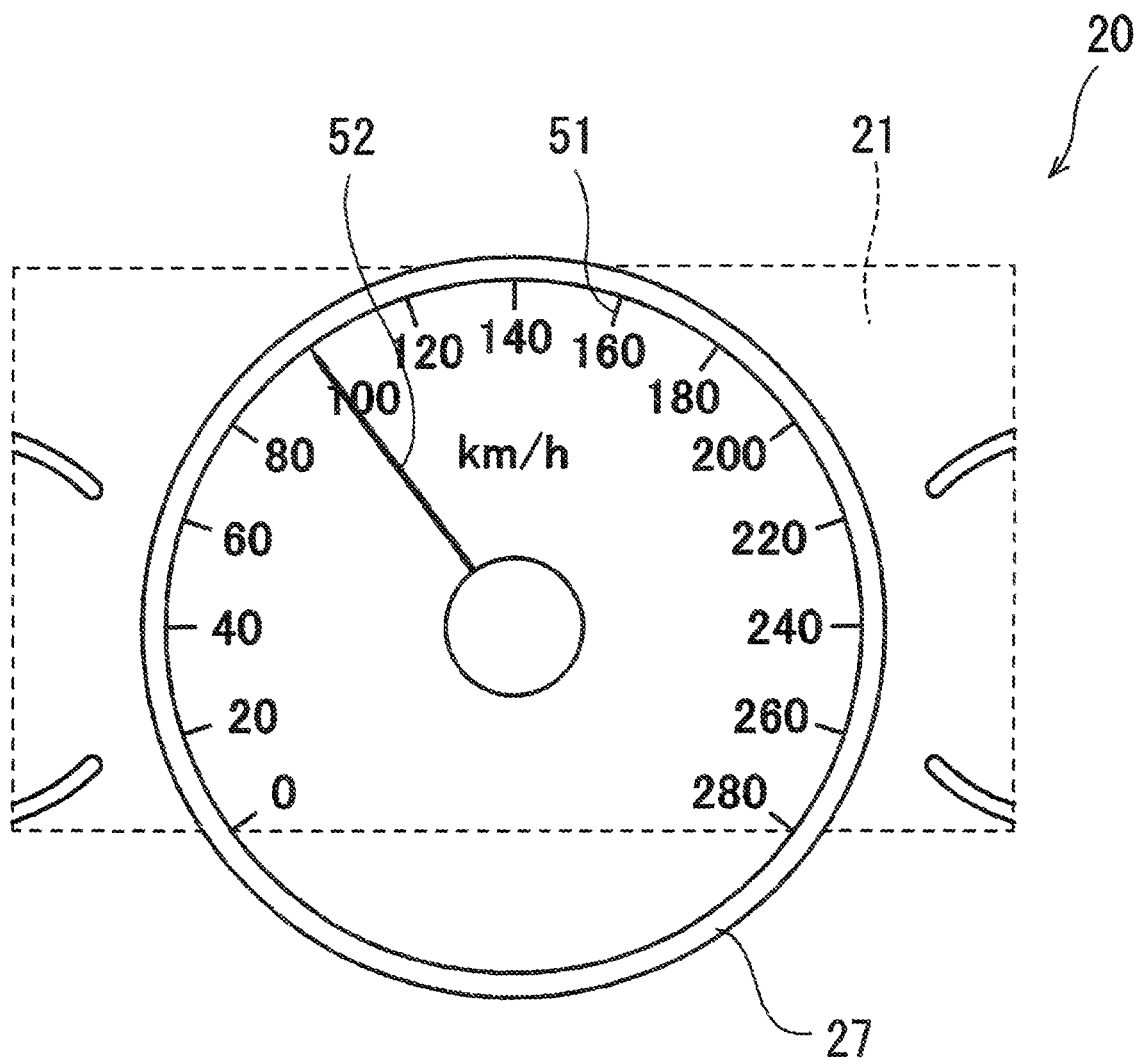
FIG. 8 is a diagram illustrating a display content in an ordinary mode.

On the other hand, in Step S8, when the flag A is not set (NO in Step S8), the control proceeds to Step S12. At a point of time when the control proceeds to Step S12, since only an own vehicle speed is acquired, the display control unit 13 determines, as a display mode, an ordinary mode in which only an own vehicle speed as illustrated in FIG. 8 is displayed, and displays the own vehicle speed. Thereafter, the control proceeds to Step S13.

Subsequently, in Step S13, determination is made whether ignition is off. When ignition is off (YES in Step S13), the control is terminated. On the other hand, when ignition is not off (NO in Step S13), the control returns to Step S1, and repeats the above-described flow.

In the present embodiment, a display mode is determined as described above, and the display unit 20 displays predetermined speed information in the determined display mode.

<Advantageous Effects, Etc.>

In this section, among various types of speed information, speed information that is arbitrarily settable by a driver is referred to as a "first speed", and speed information that is not arbitrarily settable by a driver is referred to as a "second speed". Among the above-described pieces of speed information, since a setting speed for constant speed driving control is settable by the constant speed driving setting unit 103, the setting speed belongs to the first speed. Further, since a limiting speed is recognized by the sign recognition unit 11, and cannot be arbitrarily set, the limiting speed belongs to the second speed.

Since the first speed can be set by a driver himself/herself, the first speed has a feature such that the driver relatively easily recognizes. On the other hand, since the second speed cannot be set by a driver himself/herself, the second speed has a feature such that the driver is relatively less likely to recognize. Taking into consideration these features, in the display device 100 according to the present embodiment, a setting speed for constant speed driving control belonging to the first speed, and a limiting speed belonging to the second speed are displayed in different ways (including a display position and a display method).

Specifically, the display device 100 displays a setting speed for constant speed driving control (specifically, drawings of the speed scale 51 and the setting speed pointer 53) on the inner side of a circular area surrounded by the circular frame member 27; and displays a limiting speed (specifically, a drawing of the simulated sign 54) on the outer side of the area surrounded by the circular frame member 27. In the present embodiment, by disposing the circular frame member 27 to overlap the display 21, and displaying an own vehicle speed on the inner side of the circular frame member 27 by using the speed scale 51 and the own vehicle speed pointer 52, a driver can imagine a conventional analog speed meter. A conventional analog speed meter displays speed information (own vehicle speed) on the inner side of an area surrounded by a circular frame. Therefore, in the above-described configuration, a driver can intuitively and empirically understand that speed information is displayed on the inner side of the circular frame member 27. Further, speed information displayed on the outer side of the circular frame member 27 is an unexpected indication to a driver, and the driver can easily recognize that the speed information is of a type different from an own vehicle speed.

In the present embodiment, taking into consideration such a psychological influence to a driver, a setting speed for constant speed driving control is displayed on the inner side of an area surrounded by the circular frame member 27, and a limiting speed is displayed on the outer side of the area surrounded by the circular frame member 27. Therefore, a limiting speed is easily recognized as a speed of a type different from an own vehicle speed and a setting speed. Thus, in the display device 100 according to the present embodiment, it is possible to appropriately convey each piece of speed information to a driver.

<Modifications>

In the foregoing embodiment, when the sign recognition unit 11 recognizes a limiting speed, the display device 100 displays the simulated sign 54, and emphasizes a portion of the speed scale 51 associated with the limiting speed, as compared with the other portion. Alternatively, the display device 100 may display only the simulated sign 54, and may not emphasize a portion of the speed scale 51 associated with a limiting speed.

Further, the display unit 20 in the present embodiment includes the display 21 having a display area spanning an inner side and an outer side of the circular frame member 27. Alternatively, the display unit 20 may include a plurality of displays respectively serving as display areas on an inner side and an outer side of the circular frame member 27.

Furthermore, in the present embodiment, a setting speed for constant speed driving control is described as an example of the first speed that is arbitrarily settable. As far as a speed is arbitrarily settable, the first speed is not limited to a setting speed for constant speed driving control. Likewise, in the present embodiment, a limiting speed is described as an example of the second speed that is not arbitrarily settable. As far as a speed is not arbitrarily settable, the second speed is not limited to a limiting speed.

In the present embodiment, a case is described in which a display device is mounted in an automobile. As described above, however, a display device may be mounted in a moving body other than an automobile, such as a motorcycle. In other words, a display device may be mounted in a moving body, which is not limited to an automobile. In this case, "a vehicle", "a driver", "an own vehicle speed", and "an own vehicle speed pointer" in the present embodiment are respectively read as "a moving body", "an operator", "a moving body speed", and "a moving body speed pointer".

The following is an overview of the present invention described above.

A display device according to an aspect of the present invention is a display device for displaying information relating to at least a moving body to a driver of the moving body. The display device includes a display unit for displaying a moving body speed being a speed of the moving body, a first speed that is arbitrarily settable by the driver, and a second speed that is not arbitrarily settable by the driver. The display unit displays the first speed and the second speed in ways different from each other.

The first speed is a speed that is arbitrarily settable by a driver. In other words, since the first speed is speed information set by a driver himself/herself, the first speed is relatively easily recognized by the driver. On the other hand, the second speed is a speed that is not arbitrarily settable by a driver. In other words, since the second information is not speed information that is set by a driver himself/herself, the second speed is relatively less likely to be recognized by the driver. In view of this, in the display device having the above configuration, since the first speed and the second speed are displayed in ways different from each other, a driver can recognize these pieces of speed information without confusion. Consequently, it is possible to appropriately convey each piece of speed information to a driver.

Further, in the display device having the above configuration, the display unit may include a display having a drawing function, and a frame member disposed to overlap the display. The display may include a display area spanning an inner side and an outer side of the frame member. The display may display the moving body speed and the first speed on the inner side of the frame member, and display the second speed on the outer side of the frame member. Note that a drawing function is a so-called image display function, and is a function of displaying an image such as a figure, a character, and a number.

In a conventional analog display device, an own vehicle speed is displayed by using a meter of a circular frame shape. In other words, in a conventional display device, it is often the case that speed information is displayed on the inner side of an area surrounded by a frame member. Many drivers may subconsciously conceive that speed information is displayed on the inner side of an area surrounded by a frame member. In view of the above, when speed information is displayed on the outer side of an area surrounded by a frame member, a driver may be aware that the speed information is special information, and pay attention to the speed information. Therefore, in the display device having the above configuration, by disposing the second speed, which is relatively less likely to be recognized by a driver, on the outer side of a frame member, a driver easily recognizes the second speed. Consequently, it is possible to appropriately convey each piece of speed information to a driver.

Further, the display device having the above configuration may further include a setting information acquisition unit for acquiring a setting speed for constant speed driving control that is arbitrarily set by the driver. The first speed may be the setting speed for constant speed driving control.

In the above configuration, the display device is able to display a setting speed for constant speed driving control, which is set by a driver himself/herself in such a way that the driver easily recognizes the setting speed.

Further, the display device having the above configuration may further include a sign recognition unit for recognizing a limiting speed written on a speed sign installed on an outside of the moving body. The second speed may be the limiting speed recognized by the sign recognition unit.

In the above configuration, the display device is able to display a limiting speed, which cannot be set by a driver himself/herself, and is relatively less likely to be recognized by the driver, in such a way that the driver easily recognizes the limiting speed.

Further, in the display device having the above configuration, the frame member may have a circular shape. The display may draw a speed scale along the frame member, a moving body speed pointer for designating a value of the speed scale associated with the moving body speed, a setting speed pointer for designating a value of the speed scale associated with the setting speed for constant speed driving control. The display may display the moving body speed by the speed scale and the moving body speed pointer, and the setting speed by the speed scale and display the setting speed pointer.

In the above configuration, it is possible to more appropriately convey each piece of speed information to a driver.

Further, in the display device having the above configuration, the frame member may have a circular shape. The display may draw a speed scale along the frame member, a moving body speed pointer for designating a value of the speed scale associated with the moving body speed, and a simulated sign simulating a speed sign associated with a limiting speed recognized by the sign recognition unit. The display may display the moving body speed by the speed scale and the moving body speed pointer, and display the limiting speed by the simulated sign.

In the above configuration, since the moving body speed and the limiting speed are different from each other in terms of not only a display position but also a display method (indication method), it is possible to more appropriately convey each piece of speed information to a driver.

Further, in the above display device, the display may display a portion of the speed scale associated with the limiting speed in an emphasized manner, as compared with the other portion. When the moving body speed exceeds the limiting speed, the display may display an area of the speed scale from a portion associated with the limiting speed to a portion associated with the moving body speed in an emphasized manner, as compared with the other area.

In the above configuration, a driver can instinctively recognize whether the moving body speed exceeds the limiting speed, and, when the moving body speed exceeds the limiting speed, an amount of excess of the moving body speed. Therefore, in the display device having the above configuration, it is possible to appropriately convey each piece of speed information to a driver.

The invention claimed is:

1. A display device for displaying information relating to at least a moving body to a driver of the moving body, comprising
   a display unit for displaying a moving body speed being a speed of the moving body, a first speed that is arbitrarily settable by the driver, and a second speed that is not arbitrarily settable by the driver, wherein
   the display unit includes a display having a drawing function, and a frame member disposed to overlap the display,
   the display includes a display area spanning an inner side and an outer side of the frame member,
   the display displays the moving body speed and the first speed on the inner side of the frame member, and displays the second speed on the outer side of the frame member,
   the display device further comprises a setting information acquisition unit for acquiring a setting speed for constant speed driving control that is arbitrarily set by the driver, and
   the first speed is the setting speed for constant speed driving control.

2. A display device for displaying information relating to at least a moving body to a driver of the moving body, comprising
   a display unit for displaying a moving body speed being a speed of the moving body, a first speed that is arbitrarily settable by the driver, and a second speed that is not arbitrarily settable by the driver, wherein
   the display unit includes a display having a drawing function, and a frame member disposed to overlap the display,
   the display includes a display area spanning an inner side and an outer side of the frame member,
   the display displays the moving body speed and the first speed on the inner side of the frame member, and displays the second speed on the outer side of the frame member,
   the display device further comprises a sign recognition unit for recognizing a limiting speed written on a speed sign installed on an outside of the moving body, and
   the second speed is the limiting speed recognized by the sign recognition unit.

3. The display device according to claim 1, wherein
   the frame member has a circular shape,
   the display draws
   a speed scale along the frame member,
   a moving body speed pointer for designating a value of the speed scale associated with the moving body speed, and
   a setting speed pointer for designating a value of the speed scale associated with the setting speed for constant speed driving control, and
   the display displays the moving body speed by the speed scale and the moving body speed pointer, and the setting speed by the speed scale and the setting speed pointer.

4. The display device according to claim 1, wherein
   the frame member has a circular shape,
   the display draws
   a speed scale along the frame member,
   a moving body speed pointer for designating a value of the speed scale associated with the moving body speed, and
   a simulated sign simulating a speed sign associated with a limiting speed recognized by a sign recognition unit, and
   the display displays the moving body speed by the speed scale and the moving body speed pointer, and displays the limiting speed by the simulated sign.

5. The display device according to claim 4, wherein
   the display displays a portion of the speed scale associated with the limiting speed in an emphasized manner, as compared with the other portion, and
   when the moving body speed exceeds the limiting speed, the display displays an area of the speed scale from a portion associated with the limiting speed to a portion associated with the moving body speed in an emphasized manner, as compared with the other area.

* * * * *